F. A. SPEARS.
CLOTHES BOILER.
APPLICATION FILED MAY 17, 1911.

1,019,198.

Patented Mar. 5, 1912.

Witnesses:
C. E. Wesselo
A. A. Olson

Inventor:
Frank A. Spears,
By Joshua R. H. Potts
his Attorney.

UNITED STATES PATENT OFFICE.

FRANK A. SPEARS, OF CHICAGO, ILLINOIS.

CLOTHES-BOILER.

1,019,198.      Specification of Letters Patent.      Patented Mar. 5, 1912.

Application filed May 17, 1911. Serial No. 627,670.

*To all whom it may concern:*

Be it known that I, FRANK A. SPEARS, a citizen of the United States, and a resident of the city of Chicago, county of Cook, and State of Illinois, have invented certain new and useful Improvements in Clothes-Boilers, of which the following is a specification.

My invention relates to improvements in clothes boilers and has for its object the production of a device of this character which shall be of improved construction and efficient in operation, the improvements being more particularly directed toward the construction of the cover.

Other objects will appear hereinafter.

With these objects in view my invention consists in the novel construction and arrangement of parts all as will be hereinafter fully described and more particularly pointed out in the appended claims.

Figure 1:
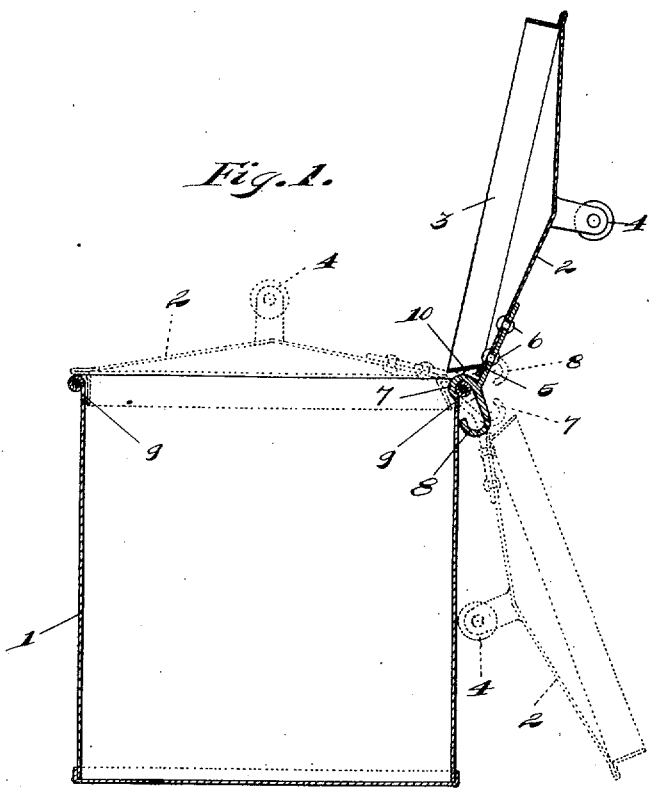
Figure 2:
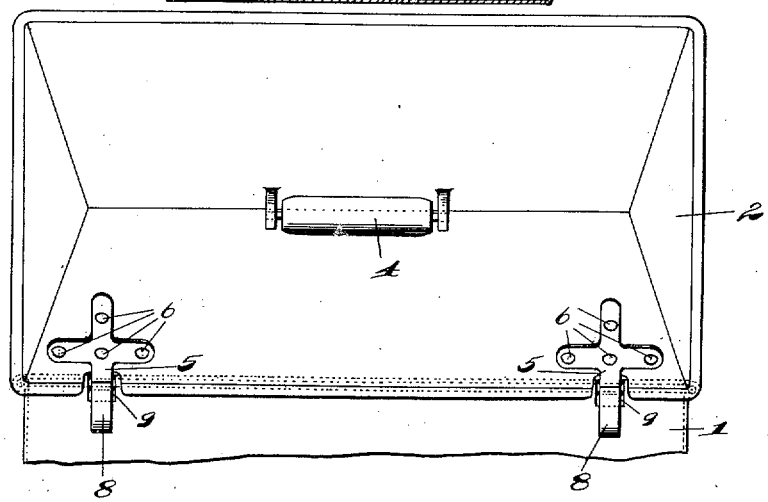

My invention will be best understood by reference to the accompanying drawing forming a part of this specification, and in which, Figure 1 is a vertical transverse section of a boiler embodying my invention, the cover being shown in its intermediate or upright position, said cover being shown in dotted lines in its closed and open positions, and Fig. 2 is a fragmentary rear elevation thereof.

The preferred form of my construction as illustrated in the accompanying drawing comprises a receptacle or vessel 1 which is preferably of substantially rectangular form and open at its upper side. The cover 2 for the receptacle 1 is preferably provided with the depending flange 3 which is adapted to engage within the upper end of said receptacle when said cover is in closing position, a handle 4 being provided centrally upon the upper side of said cover. Arranged at one edge of the cover 2 adjacent the extremities thereof are hinge members 5 the inner ends of which are secured rigidly to the cover 2 preferably by means of rivets 6. The outer end portions of the members 5 are angularly disposed relative to the inner end portions thereof and are of double hooked construction each comprising an inner hooked portion 7 and an outer hooked portion 8. When in operation the hooked portions 7 of the members 5 engage the adjacent upper edge of the receptacle, said edge being preferably beaded as indicated to correspond with the formation of the hooks and the adjacent wall of said receptacle adjacent the upper edge thereof is slotted as at 9 to accommodate said hooked portions as will be readily understood. The hooked portions 8 are so disposed relative to the hooked portions 7 that, when the cover 2 is in upright position, as shown in Fig. 1, the former will engage against the outer side of the adjacent wall of the receptacle 1 serving to maintain said cover in upright position. If desired the hooked portions 7 may be released from engagement with the upper edge of the receptacle and the hooked portions 8 arranged in engagement therewith to maintain the cover in suspended position with the handle 4 resting against the adjacent wall of the receptacle, as shown in dotted lines in Fig. 1. Or, if desired, the construction is such that the cover may be completely detached, sufficient space being provided between the adjacent ends of the hooked portions 7 and 8 to permit of the passage of the beaded edge of the receptacle. The cover and receptacle are symmetrical in design and the opposite longitudinal wall of the receptacle is slotted as at 9 and the upper edge thereof is beaded so that the position of the cover 2 upon the receptacle may be reversed if desired.

Arranged upon the inner side of the cover 2 adjacent the hinged edge thereof is an angularly disposed deflector strip or plate 10, the latter being so arranged that, when the cover is in upright position as shown in full lines in Fig. 1, the same will overhang the upper edge of the adjacent wall of the receptacle serving as a means of deflecting water which may drip down the inner surface of the cover into said receptacle. In clothes boilers of conventional construction when the cover is in upright position the water of condensation which accumulates on the inner surface thereof when the same is in closed position drips down the same dropping therefrom upon the top of the stove, table or other construction upon which the boiler is arranged resulting in inconvenience and considerable annoyance. With my construction this objection will be avoided since the water dripping down the inner surface of the cover will be directed by the deflector plate 10 and deposited into the receptacle.

A boiler of the construction as set forth is durable and economical and the cover is so attached to the receptacle as to afford the greatest convenience and advantage.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claims.

Having described my invention what I claim as new and desire to secure by Letters Patent is:

1. In a device of the character described, the combination of a receptacle open at its upper side; a cover for said receptacle; hooked members rigidly secured to said cover at one edge thereof adapted to detachably engage over the adjacent edge of said receptacle for hingedly securing said cover thereto, each of said hooked members comprising a shank; and inner and outer hooked portions formed integrally with said shank, said outer hooked portions being adapted when said inner hooked portions are in an engagement with said edge of said receptacle to engage against the outer side of the adjacent side of said receptacle to maintain said cover in upright position, said receptacle adjacent the upper edge thereof being slotted to afford clearance for said inner hooked portions when said cover is in closed position, substantially as described.

2. In a device of the character described, the combination of a receptacle open at its upper side; a cover for said receptacle; hooked members rigidly secured to said cover at one edge thereof adapted to detachably engage over the adjacent edge of said receptacle for hingedly securing said cover thereto, each of said hooked members comprising a shank; and inner and outer hooked portions formed integrally with said shank, said outer hooked portions being adapted when said inner hooked portions are in an engagement with said edge of said receptacle to engage against the outer side of the adjacent side of said receptacle to maintain said cover in upright position, said receptacle adjacent the upper edge thereof being slotted to afford clearance for said inner hooked portions when said cover is in closed position, said outer hooked portions being adapted when in engagement with said edge of said receptacle to support said cover in suspended position, substantially as described.

3. In a device of the character described, the combination of a receptacle open at its upper side; a cover for said receptacle; double hooked members arranged on said cover at one edge thereof adapted to detachably engage over the adjacent edge of said vessel for hingedly securing said cover thereto, each of said hooked members comprising inner and outer hooked portions, said outer hooked portions being adapted when said inner hooked portions are in engagement with said edge of said receptacle to engage against the outer side of the adjacent wall of said receptacle to maintain said cover in upright position, said outer hooked portions being adapted when in engagement with said edge of said receptacle to support said cover in suspended position, said vessel adjacent the upper edge thereof being slotted to accommodate said hooked members, substantially as described.

In testimony whereof I have signed my name to this specification in the presence of two subscribing witnesses.

FRANK A. SPEARS.

Witnesses:
 HELEN F. LILLIS,
 JOSHUA R. H. POTTS.